(12) United States Patent
Heilmann

(10) Patent No.: US 11,858,222 B2
(45) Date of Patent: Jan. 2, 2024

(54) METHOD FOR APPLYING A MATERIAL TO A FIBER COMPOSITE COMPONENT

(71) Applicant: DEUTSCHES ZENTRUM FÜR LUFT—UND RAUMFAHRT E.V., Cologne (DE)

(72) Inventor: Lennert Heilmann, Bremen (DE)

(73) Assignee: DEUTSCHES ZENTRUM FUER LUFT—UND RAUMFAHRT E.V., Cologne (DE)

( * ) Notice: Subject to any disclaimer, the term of this patent is extended or adjusted under 35 U.S.C. 154(b) by 0 days.

(21) Appl. No.: 17/054,263

(22) PCT Filed: May 9, 2019

(86) PCT No.: PCT/EP2019/061961
§ 371 (c)(1),
(2) Date: May 21, 2021

(87) PCT Pub. No.: WO2019/215294
PCT Pub. Date: Nov. 14, 2019

(65) Prior Publication Data
US 2021/0316496 A1    Oct. 14, 2021

(30) Foreign Application Priority Data
May 11, 2018  (DE) ...................... 10 2018 111 306.4

(51) Int. Cl.
*B29C 65/00* (2006.01)
*B29C 59/00* (2006.01)
(Continued)

(52) U.S. Cl.
CPC ........ *B29C 66/0222* (2013.01); *B29C 59/005* (2013.01); *B29C 59/026* (2013.01);
(Continued)

(58) Field of Classification Search
CPC ............ B29C 66/0222; B29C 66/0224; B29C 66/022; B29C 66/73161; B29C 66/73753;
(Continued)

(56) References Cited

U.S. PATENT DOCUMENTS 4,902,215 A    2/1990  Seemann, III
9,789,646 B2 *  10/2017  MacAdams ......... B29C 66/0224
(Continued)

FOREIGN PATENT DOCUMENTS

DE    10 2011 010 384 A1    8/2012
DE    10 2011 082 664 A1    3/2013
(Continued)

OTHER PUBLICATIONS

Heilmann et al., "Proofed Bonding—A Novel Method for Verifying Adhesion in Adhesively Bonded Composite Repairs", Jun. 2018.*
(Continued)

*Primary Examiner* — John L Goff, II
(74) *Attorney, Agent, or Firm* — WCF IP

(57) ABSTRACT

The invention relates to a method for applying a material (30) to a fiber composite component within an application region (13) of the fiber composite component, the fiber composite component being produced from a fiber composite material having a fiber material (11) and a matrix material (12), the method comprising the following steps: —providing at least one monofilament woven fabric (20), in which a plurality of or all threads each consist of a single filament, —arranging the at least one monofilament woven fabric (20) on a fiber preform (10) in the application region (13), which fiber preform is formed from the fiber material (11) of the fiber composite material, —curing, in a common process step, the matrix material (12) of the fiber composite material, which matrix material embeds the fibers material (11) of the fiber preform (10), and a matrix material (12) embedding the
(Continued)

Figure 1A:
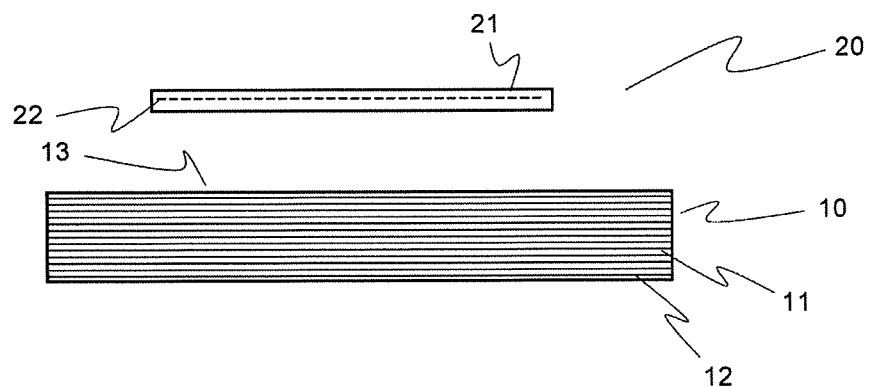
Figure 1B:
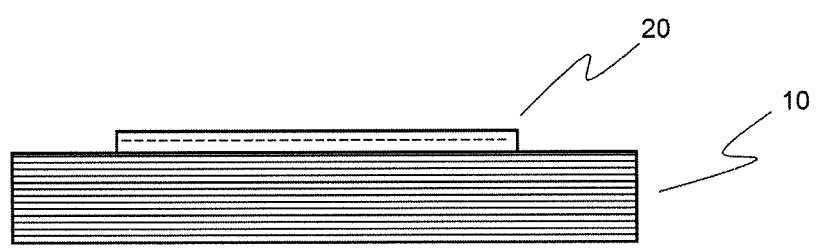

monofilament woven fabric (20), thereafter the matrix material (12) of the fiber preform (10) and the matrix material (12) of the monofilament woven fabric (20) being at least partially cured, —tearing off the monofilament woven fabric (20) integrally bonded to the fiber preform (10), and—applying the material (30) in the application region (13) after the monofilament woven fabric (20) has been torn off.

11 Claims, 3 Drawing Sheets

(51) Int. Cl.
*B29C 59/02* (2006.01)
*B29C 73/10* (2006.01)
*B29K 105/08* (2006.01)

(52) U.S. Cl.
CPC .. *B29C 66/73161* (2013.01); *B29C 66/73753* (2013.01); *B29C 73/10* (2013.01); *B29K 2105/0845* (2013.01)

(58) Field of Classification Search
CPC ........ B29C 66/30321; B29C 66/30322; B29C 66/30325; B29C 66/30326; B29C 59/026; B29C 73/10; B29C 70/547; C09J 5/02; B29K 2105/0845

See application file for complete search history.

(56) References Cited

U.S. PATENT DOCUMENTS

| 2013/0129957 A1* | 5/2013 | Zhao | H04L 67/34 428/40.1 |
| 2017/0282446 A1* | 10/2017 | Cavaliere | B29C 66/1122 |

FOREIGN PATENT DOCUMENTS

| EP | 0 213 109 A2 | 3/1987 | |
| EP | 2 103 416 A2 | 9/2009 | |
| EP | 2 285 553 B1 | 12/2012 | |
| GB | 2 360 483 A | 9/2001 | |
| WO | WO-2016034809 A1 * | 3/2016 | ......... B29C 35/0266 |

OTHER PUBLICATIONS

REEFMAGNET: "Peel ply . . . how difficult/easy", cruiserforum.com, Nov. 19, 2014.

* cited by examiner

METHOD FOR APPLYING A MATERIAL TO A FIBER COMPOSITE COMPONENT

The invention relates to a method for applying a material to a fiber composite com-ponent within an application region of the fiber composite component, wherein the fiber composite component is produced from a fiber composite material comprising a fiber material and a matrix material. The invention also relates to a corresponding use thereof.

On account of their weight-specific strength and stiffness, it is virtually impossible not to conceive of fiber composite materials in the production of any components. Fiber composite materials in this case primarily have two essential constituents, namely a fiber material on the one hand and a matrix material on the other. The production of fiber composite components from such a fiber composite material generally involves bringing the fiber material into the corresponding subsequent component form and then curing the matrix material in which the fiber material is embedded. In the vast majority of cases, the curing takes place by way of temperature and possibly pressure application, wherein, as a result of the curing, the load-bearing fibers of the fiber material are forced into their predetermined direction and, together with the cured matrix material, thereby form an integral unit for load dissipation.

The matrix material, in which the fiber material of the fiber composite material is correspondingly embedded, can in this case already be present in the fiber material (so-called prepregs) or can be infused at a later stage into a so-called fiber preform, constructed from dry fiber materials. Here, a fiber preform represents a type of preliminary component, which is formed from the fiber material of the fiber composite material and in this case at least partially obtains the subsequent component form of the fiber composite component to be produced. The curing of the matrix material, which has been embedded in the fiber material of the fiber preform, thus makes it possible to produce the fiber composite component. Accordingly, the fiber preform can be produced both from dry fiber material and from pre-impregnated fiber materials of a fiber composite material.

In production, fiber composite components have some disadvantages compared with isotropic materials, since the component form of a fiber composite component generally needs to be formed by corresponding forming tools which represent a type of negative imprint of the subsequent component. It is therefore not uncommon for complex fiber composite components to be adhesively bonded together from various structural elements, either produced from fiber composite materials or composed of isotropic materials, in order to be able to produce the complex geometry.

In the case of local damage, it is also possible to repair fiber composite components by way of adhesive bonding of repair patches, in that the fiber material and matrix material is initially removed from the damaged site and the damaged site is thus prepared, and then a repair patch is subsequently adhesively bonded in, with the result that the free space formed by the repair operation is filled by the repair patch. Adhesive bonding of this kind, in which at least one of the parts to be joined is a fiber composite component made from a fiber composite material, is in this case not entirely uncritical with regard to certification and validation. Specifically in the aerospace sector, for example, high standards have to be imposed on an adhesive bond of this kind in order to in particular also satisfy the requirements in terms of safety in the case of safety-critical components. It is therefore of particular interest to realize adhesive bonds of this kind in a process-reliable manner.

Such fiber composite components are often also enhanced by lacquers and coatings, such that those materials which are applied to such a finished fiber composite component have to be applied in a process-reliable manner and be reliably retained on the surface of such a fiber composite component. In this case, there is the fundamental need for coatings of this kind to be reliably retained on the surface of the fiber composite component even under given stress conditions.

Subsequently published DE 10 2017 113 430.1 discloses a method for testing a joining surface of a fiber composite component, and also a method for adhesive bonding, in that a woven test fabric with an adhesive primer is adhesively bonded onto the fiber composite component and cured and subsequently pulled off, wherein the joining surface is subjected to qualitative analysis with regard to the fracture pattern. In addition, a fracture pattern of this kind, formed by the adhesive primer, also makes it possible to produce an adhesive bond as a result of application of an adhesive material and joining with a further component.

However, it has been shown that the additional adhesive primer can complicate the entire production process. It has also been shown that the woven multifilament fabric which is often used in practice is not suitable as woven pull-off fabric for such a method in the case of certain materials to be applied. This is because, on the one hand, the pulling off of the woven fabric is intended to generate a cleaner, activated surface, whereas, on the other hand, the woven fabric is intended to be peeled off manually, preferably without a high expenditure of force, wherein the component must not be damaged in the process. In order to generate a particularly adhesive surface, in the case of polymeric matrix materials, chemical chains of the matrix material have to be broken. This is achieved in that a part of the underlying matrix material is removed along with the woven fabric. In order to break out the matrix material, however, an increased expenditure of force is required, and the risk of damage to the fiber composite structure, in particular the reinforcing fibers, rises considerably as a result.

When a woven multifilament fabric is used as woven pull-off fabric, which for the purpose of easy detachment is very tightly woven and has no, or only very small, free spaces between the weft and warp threads, a completely smooth surface which has merely a wavy topology as a result of the imprint of the woven fabric threads is therefore usually produced after the pull-off operation. However, comprehensive chemical activation very rarely takes place. An additional factor is that residues of the fibers or of substances located on the fibers can remain on the generated surface. It is thus not possible to make definite statements as to whether adhesive bonding or lacquering can be reliably performed on the surface generated by this method. Complicated monitoring, reworking by way of grinding or radiation and high outlay are accordingly required for quality assurance.

U.S. Pat. No. 7,736,452 B2 discloses a method for the destruction-free inspection of an adhesive bond during the repair of fiber composite components, the adhesive bond being inspected indirectly here. The damaged site on the fiber composite component is repaired in a first step and a corresponding adhesively bonded-in repair patch is used. A test patch, which has the same properties and comprises the same material as the repair patch, is adhesively bonded on in the immediate surroundings of the repaired site and is loaded with a corresponding force after the adhesive bond has been cured. If the test patch withstands the force applied in this way, the durability of the repaired site is thus assumed.

US 2008/0011075 A1 discloses a method for the quality control of a fiber composite component and of a possible adhesive bond, a metallic structure being adhesively bonded onto the surface of the fiber composite component here. In this case, the metallic structure has a predetermined breaking point. After the adhesive bond has been cured, a force is then applied to the metallic structure, wherein an effective adhesive bond to the surface of the fiber composite component is assumed if the predetermined breaking point breaks first. However, if the adhesive bond breaks instead of the predetermined breaking point, said bond was not free from defects.

Accordingly, it is an object of the present invention to specify an improved method for applying a material, with which method the surface of the fiber composite component can be prepared such that adherence of the material can be ensured under the given process parameters.

A method for applying a material to a fiber composite component within an application region of the fiber composite component is proposed, wherein the fiber composite component is produced from a fiber composite material comprising a fiber material and a matrix material. In this case, the material to be applied can for example be an adhesive in order to join the fiber composite component to another structural element. However, the material can also be used to coat the fiber composite component, for example in the form of lacquers.

The application of a material to a fiber composite component is in this case understood to mean that a material is connected to the fiber composite component in a materially bonded manner, for example a material which is different to the fiber composite material and which is not a fiber composite material, such that the applied material is retained on the fiber composite component in a materially bonded manner. In this case, the material is intended to be applied in particular after the matrix material in which the fiber material is embedded has been completely cured. However, it is also conceivable for the application to already take place at a time when the matrix material has not yet been completely cured, for example as a result of an incomplete curing reaction or as a result of a specially adapted resin/curing agent ratio in the matrix material in which the fiber material is embedded.

According to the invention, at least one woven monofilament fabric is in this case provided, in which a plurality or all of the threads are in each case composed of an individual filament. A woven monofilament fabric of this kind thus has threads (weft thread, warp thread) which are not in each case composed of a plurality of individual filaments as in the case of a woven multifilament fabric, but rather in which the individual threads per se represent an individual filament. Such a thread of a woven monofilament fabric accordingly does not have a plurality of individual filaments but rather is formed exclusively of one individual filament. The individual threads or individual filaments are typically processed in a single processing step.

A woven monofilament fabric of this kind is then arranged in the form of a woven pull-off fabric on the fiber preform in the application region. The fiber preform is in this case formed from the fiber material of the fiber composite material and can be formed in particular from dry or pre-impregnated fiber materials. The woven monofilament fabric in the application region is used at a later stage to prepare the surface within the application region such that the surface in the application region has a high surface energy and thus is correspondingly prepared for the application of the material.

After the woven monofilament fabric has been arranged on the fiber material of the fiber preform in the application region, the matrix material in which the fiber material of the fiber preform is embedded, and also a matrix material in which the woven monofilament fabric is embedded, are cured in a common process step in order to thus in particular also produce the fiber composite component. In this case, the same matrix material can be used both for the fiber material of the fiber preform and for the woven monofilament fabric, such that use is made of the same matrix material for the woven monofilament fabric as for the fiber material of the fiber preform. However, it is also conceivable for different fiber materials to be used here, which is for example expedient if pre-impregnated materials are used, that is to say if the fiber material of the fiber preform and/or the woven monofilament fabric have/has already been pre-impregnated with the respective matrix material.

The curing of the matrix materials thus produces a fixed connection in the boundary region between fiber preform and woven monofilament fabric, as a result of which the woven monofilament fabric is initially connected to the fiber composite component in a materially bonded manner in the application region. After the matrix material of the fiber preform and the matrix material of the woven monofilament fabric have thus been at least partially cured, that is to say at least a partial reaction with regard to the polyreaction or polymerization has taken place and thus the woven monofilament fabric has been joined to the fiber preform in a materially bonded manner, the woven monofilament fabric which is connected to the fiber preform in a materially bonded manner is pulled off, as a result of which the matrix material in the application region is in particular cohesively fractured. Cohesively fractured means that the matrix material in itself has been broken, that is to say that upon fracture there is a crack through the material. The surface thus produced is particularly desirable and in this case generates a high surface energy to which other materials adhere particularly well and which can be readily wetted.

The corresponding material is subsequently applied within the application region after the woven monofilament fabric has been pulled off. In the present invention, it has been advantageously recognized that the use of a woven monofilament fabric as woven pull-off fabric for preparation of an application surface can achieve a situation whereby hardly any laminate damage occurs during the removal of the woven pull-off fabric in spite of a high proportion of cohesive fracture. Woven multifilament fabrics known in practice frequently lead to laminate damage in spite of a very low proportion of cohesive fracture. In woven multifilament fabrics, the reinforcing fibers and the multiplicity of adjacent filaments of the woven pull-off fabric frequently contact one another over a large area and partially slide into one another. This leads partially to the undesired extraction of reinforcing fibers during the removal of the woven pull-off fabric. By contrast, the use of a woven monofilament fabric does not generate these disadvantages and said fabrics, on account of their filament diameters, which are generally many times greater, and the exposed filaments (without direct neighbors), afford few opportunities for entrainment of reinforcing fibers. As a rule, the cohesive fracture is generated in the region of the thinnest cross section of the woven fabric opening and is thus spatially separated from the reinforcing fibers, wherein, on account of the notch effect, the mechanical stress present upon fracture is greater in the region of the resulting fracture surface than on the plane of the reinforcing fibers.

In the present invention, it has furthermore been advantageously recognized that the use of woven monofilament fabrics leads to a residue-free extraction of the woven pull-off fabric. This is likewise on account of the exposed filaments and their greater diameters. In the case of woven multifilament fabrics, it is frequently the case that parts or fragments of the filaments remain on the component surface, said parts or fragments being particularly disadvantageous for a subsequent process for materially bonded joining.

Furthermore, the use of a woven monofilament fabric as woven pull-off fabric leads to very pronounced surface enlargement and surface texturing. The enlarged surface is in this case particularly advantageous for subsequent coating operations, since there is more contact area available for the formation of adhesion forces. The surface texturing additionally makes it possible to form a form fit, such that in particular coatings and adhesives adhere particularly well to surfaces prepared in this way.

The woven monofilament fabric may for example be a plain-weave fabric, twill-weave fabric, atlas-weave fabric, plain-dutch-weave fabric, leno-weave fabric and/or triaxial woven fabric.

The fiber composite component is not a test specimen which is produced merely for test and inspection purposes and which thereafter has no further use. It is rather the case that, in the context of the present invention, the fiber composite component is a real component which has a corresponding intended use after production.

In a further advantageous embodiment, the woven monofilament fabric is configured in such a way that one or more weft threads and/or one or more warp threads are in each case composed of an individual filament; however, all of the weft threads and all of the warp threads are advantageously configured in the form of individual filaments.

In a particularly advantageous embodiment, a woven monofilament fabric is provided in which the sum of all open areas of the meshes of the woven monofilament fabric corresponds to at least 30%, preferably at least 50%, particularly preferably between 50% and 70%, of the total base area of the woven monofilament fabric. The open areas of a mesh of the woven monofilament fabric are in this case defined by the extent of the meshes in a first dimension and in a second, areal dimension (usually square), wherein the sum of the open areas of all of the meshes corresponds to at least 30% of the total area of the entire woven monofilament fabric.

In this way, it can particularly advantageously be ensured that a cohesive fracture surface is produced within the open areas of a mesh when the woven monofilament fabric is pulled off, which is particularly benefited by the embodiment of the woven monofilament fabric from individual filaments. These cohesive fracture surfaces are in this case particularly desirable since they have a particularly high surface energy.

It is therefore also particularly advantageous for a woven monofilament fabric to be provided which, after being pulled off from the fiber composite component, has a cohesively fractured area which corresponds to at least 30%, preferably at least 50%, particularly preferably between 50% and 70%, of the geometric area of the application region. This means that the sum of all cohesively fractured areas within the application region corresponds, in sum, to at least 30%, preferably at least 50%, particularly preferably between 50% and 70%, of the total area of the application region.

In a further advantageous embodiment, the woven monofilament fabric is provided with individual filaments made from polyester, polyethylene, polyethylene terephthalate, polyamide and/or metal, in particular steel.

It has for example been shown that, a woven pull-off fabric made from steel, in particular stainless steel with, for example, a chromium oxide layer, the surface to be adhesively bonded of the component is prepared for adhesive bonding in a particularly satisfactory manner, since the proportion of cohesive fracture is particularly high and hardly any residues which adversely affect a bond remain on the surface. As a result, it is also possible for less robust adhesives to adhere to the fiber surface in a very satisfactory and long-lasting manner. The reason for this is probably that no interaction which is detrimental to the adhesive bonding takes place between the inert chromium oxide layer on the surface of woven fabric made from stainless steel and the matrix material. By contrast, when woven pull-off fabrics made from polymeric materials are used, residues which adversely affect adherence of the adhesive may remain on the component surface.

Furthermore, it is conceivable for an adhesive to be applied as material and for a structural element to be joined to the fiber composite component in an adhesively bonded manner by means of the applied adhesive. In this case, such an adhesive can be applied separately in the application region to the cohesively fractured surface, the structural element to be joined then being adhesively bonded on subsequently. However, it is also conceivable for the adhesive and the structural element to be joined thereto to be joined, in a common process step, to the cohesively fractured surface in the application region. Furthermore, it is conceivable for a coating, such as, for example, lacquer, to be applied as material.

In a further advantageous embodiment, one or more threads, preferably all of the threads or individual filaments, of the woven monofilament fabric have a functional coating, wherein, after the pull-off operation, at least a part of the coating substance remains on the fiber composite component (for example in the imprint regions of the individual filaments) and assumes further functions, for example as a crack arrestor or as an adhesion promoter. The functional coating forms a fixed connection to the matrix material of the component and detaches from the fiber as soon as the woven fabric is pulled off.

The object is moreover also achieved by the use of a woven monofilament fabric, in which a plurality or all of the threads are in each case composed of an individual filament, as woven pull-off fabric during the application of a material to a fiber composite material in accordance with the method described above is claimed.

Figure 2:
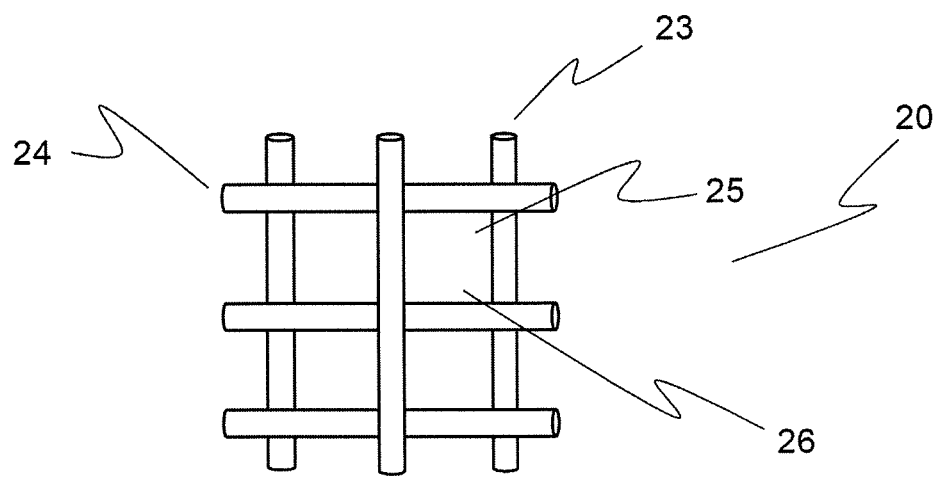
Figure 3:
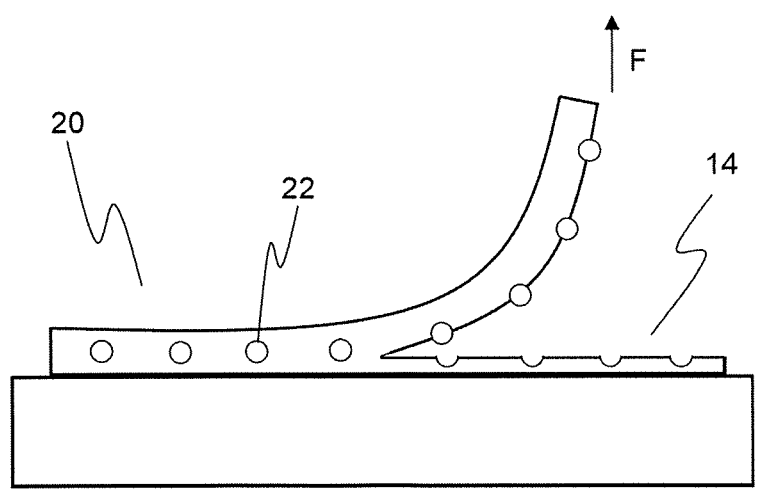

The invention is explained in more detail in exemplary fashion with reference to the appended figures, in which:

FIGS. 1a-1d—show schematic illustrations of the essential method steps of the method according to the invention;

FIG. 2—shows a schematic illustration of a woven monofilament fabric;

FIG. 3—shows a schematic macroscopic illustration of a fracture pattern.

In FIGS. 1a-1d, a possible progression of the method according to the invention for applying a material is illustrated. For example, a fiber preform 10 is initially provided in the first step 1a, said preform at least partially having the subsequent component form of the fiber composite component to be produced. The fiber preform 10 has in this case been formed from a fiber material 11 in that a plurality of layers of fiber materials were laid over one another. In the example of FIG. 1a, a very pronouncedly simplified component form is illustrated. It goes without saying that any desired complex component form can be produced here.

Furthermore, pre-impregnated fiber materials 11 were used, such that the matrix material 12 in which the fiber material 11 is embedded is contained in the fiber preform 10 already during the production of the fiber preform 10.

Furthermore, a woven monofilament fabric 20 is provided which likewise already contains a matrix material 21 and thus is likewise pre-impregnated. The woven monofilament fabric 20 has a plurality of woven fabric threads 22 which are configured in the form of individual filaments.

In the next method step 1b, the woven monofilament fabric 20 is then arranged within an application region 13 of the fiber preform, wherein another material is intended to be applied within the application region 13 at a later stage. However, in step 1b, the woven monofilament fabric 20 is then initially arranged in the application region 13, wherein, in this case, the matrix material 12 of the fiber preform 10 and the matrix material 21 of the woven monofilament fabric 20 come into contact with one another and possibly mix with one another in the boundary region (boundary layer).

The matrix material 12 of the fiber preform 10 and the matrix material 21 of the woven monofilament fabric 20 are subsequently at least partially cured, and this connects the woven monofilament fabric 20 to the fiber preform 10 or the fiber composite component in a materially bonded manner.

Figure 1C:
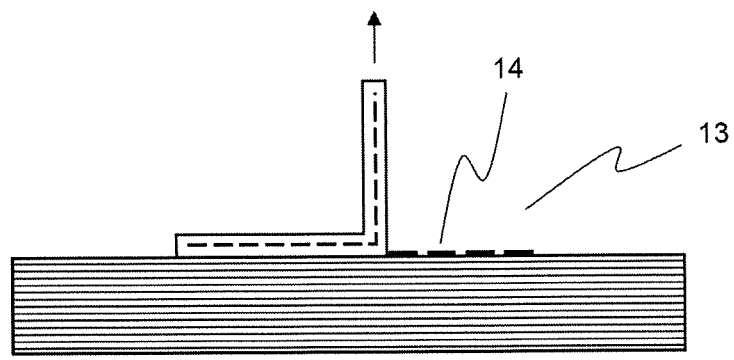
Figure 1D:
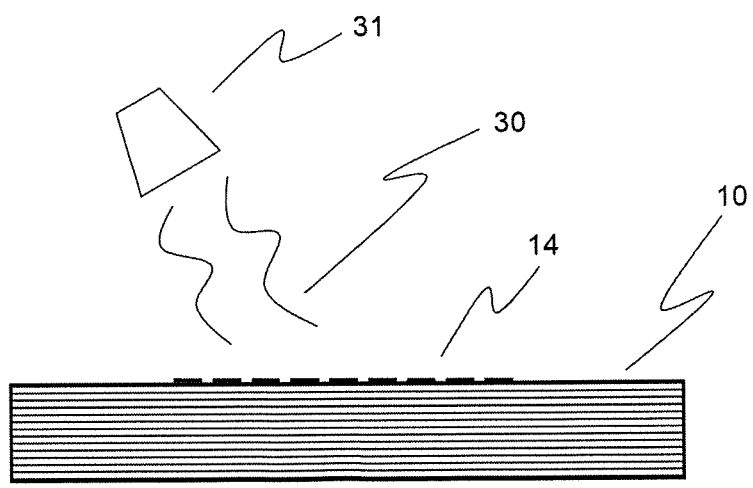

As shown in FIG. 1c, the woven monofilament fabric 20 is subsequently pulled off perpendicularly with respect to the fiber preform 10 or the fiber composite component, such that the materially bonded connection between the woven monofilament fabric 20 and the fiber composite component or the fiber preform 10 is cohesively fractured within the application region 13. The resulting rough surface 14 within the application region 13 in this case has a high surface energy, wherein the use of a woven monofilament fabric in particular prevents reinforcing fibers of the fiber material 11 of the fiber preform 10 from also being ripped out and damaged.

The proportion of the cohesively fractured surface within the application region 13 can in this case be set by the open areas or the mesh width of the woven monofilament fabric 20, with it being necessary here to take account of the fact that the woven monofilament fabric 20 as woven pull-off fabric also has to be removed from the fiber preform 10, after having been connected thereto in a materially bonded manner, without said fabric tearing in the process. In step 1d, the actual material 30 is subsequently applied within the application region 13, said application being able to be effected by means of an applicator 31, for example.

FIG. 2 shows a schematically pronouncedly simplified depiction of a detail of a woven monofilament fabric 20 in which the warp threads 23 and the weft thread(s) 24 are composed of an individual filament. This means that the warp threads 23 and the weft threads 24 are not multifilaments and thus do not have a plurality of filaments per se. It is rather the case that each warp thread 23 or weft thread 24 is composed of an individual filament. In this case, a mesh 25 is delimited by the respective warp thread and weft thread, wherein the open area 26 of a mesh 25 is in this case that region which is geometrically defined by the mesh width and mesh height.

In this case, the materially bonded connection between the woven monofilament fabric 20 and the fiber preform or the fiber composite component 10 is cohesively fractured within said open area 26, which leads to the desired surface energy.

FIG. 3 schematically shows the operation for pulling off the woven monofilament fabric 20 from the fiber preform 10. As can be seen, the materially bonded connection is in each case coherently fractured between the individual filaments 22, such that a cohesive surface 14 is produced here.

LIST OF REFERENCE DESIGNATIONS

10—Fiber preform
11—Fiber material
12—Matrix material
13—Application region
14—Cohesively fractured surface
20—Woven monofilament fabric
21—Matrix material of the woven monofilament fabric
22—Woven fabric threads
23—Warp threads
24—Weft threads
25—Meshes
26—Open areas
30—Material to be applied
31—Applicator

The invention claimed is:

1. A method for applying a material to a fiber composite component within an application region of the fiber composite component, wherein the fiber composite component is a fiber composite material comprising a fiber material and a first matrix material, comprising:
   providing a woven monofilament fabric comprising a woven configuration of threads embedded in a second matrix material, wherein a plurality of the threads or all of the threads are each composed of an individual filament,
     wherein the provided woven monofilament fabric has a total base area and comprises warp monofilament threads and weft monofilament threads in a woven configuration defining meshes, each mesh having an open area, wherein a sum of all the meshes' respective open areas is at least 30% of the total base area of the woven monofilament fabric;
   arranging the woven monofilament fabric on an application region of a fiber preform which is formed of the fiber material of the fiber composite material;
   forming a materially bonded connection between the woven monofilament fabric and the fiber preform, comprising curing the first matrix material in which the fiber material of the fiber preform is embedded, and the second matrix material in which the threads of the woven monofilament fabric are embedded, in a common process step and,
   after forming the materially bonded connection between the fiber preform and the woven monofilament fabric,
     forming a cohesively fractured surface on the application region of the fiber preform, comprising pulling off the woven monofilament fabric from the fiber preform in a manner cohesively fracturing the materially bonded connection, and
     applying material on the cohesively fractured surface in the application region,
     wherein the woven monofilament fabric is provided in such a way that, after the woven monofilament fabric has been pulled off, a sum of all cohesively fractured regions within the application region corresponds to at least 30% of a total area of the application region.

2. The method as claimed in claim 1, wherein the provided woven monofilament fabric is a plain-weave fabric, twill-weave fabric, atlas-weave fabric, plain-dutch-weave fabric, leno-weave fabric, and/or triaxial woven fabric.

3. The method as claimed in claim 1 wherein the provided woven monofilament fabric comprises weft threads and warp threads and each of the weft threads is composed of an individual filament or each of the warp threads is composed of an individual filament.

4. The method as claimed in claim 1 wherein the woven monofilament fabric comprises individual filaments made from polyester, polyethylene, polyethylene terephthalate, polyamide, and/or metal.

5. The method as claimed in claim 1 wherein the second matrix material in which the woven monofilament fabric is embedded, and the first matrix material in which the fiber material of the fiber preform is embedded are mutually identical materials.

6. The method as claimed in claim 1, further comprising providing the fiber composite material, in a configuration that includes the fiber material pre-impregnated with the first matrix material,
wherein providing the woven monofilament fabric comprises providing the threads pre-impregnated with the second matrix material.

7. The method as claimed in claim 1 wherein applying material on the cohesively fractured surface comprises applying an adhesive in the application region, and the method further comprises joining a structural element to the fiber composite component in an adhesively bonded manner by means of the applied adhesive.

8. The method as claimed in claim 1 wherein the threads of the woven monofilament fabric have a functional coating, wherein, after the pull-off operation, at least a part of a coating substance remains on the fiber composite component and assumes further functions.

9. The method as claimed in claim 1, wherein the first matrix material is a different material from the second matrix material.

10. The method as claimed in claim 1, further comprising providing the fiber composite material, by steps comprising:
providing the fiber material as a dry fiber material; and
infusing the first matrix material into the dry fiber material.

11. The method as claimed in claim 1 wherein applying material on the cohesively fractured surface comprises applying, as the material, a coating in the application region.

* * * * *